US011676589B2

(12) United States Patent
Shuman et al.

(10) Patent No.: US 11,676,589 B2
(45) Date of Patent: Jun. 13, 2023

(54) SYSTEMS AND METHODS FOR VOICE SEARCH AND RESPONSE RETRIEVAL

(71) Applicant: Global Strategies International LLC, Bend, OR (US)

(72) Inventors: Eric Shuman, Bend, OR (US); Brad Wilcox, Redmond, OR (US); Paul Henry, Bend, OR (US); Jeremy Sanchez, Bend, OR (US)

(73) Assignee: GLOBAL STRATEGIES INTERNATIONAL LLC, Bend, OR (US)

( * ) Notice: Subject to any disclaimer, the term of this patent is extended or adjusted under 35 U.S.C. 154(b) by 178 days.

(21) Appl. No.: 17/002,720

(22) Filed: Aug. 25, 2020

(65) Prior Publication Data

US 2021/0082426 A1  Mar. 18, 2021

Related U.S. Application Data

(60) Provisional application No. 62/901,560, filed on Sep. 17, 2019.

(51) Int. Cl.
*G10L 15/30* (2013.01)
*G10L 15/22* (2006.01)
(Continued)

(52) U.S. Cl.
CPC .............. *G10L 15/22* (2013.01); *G06F 3/167* (2013.01); *G10L 13/00* (2013.01);
(Continued)

(58) Field of Classification Search
CPC .......... G06F 3/165; G06F 3/167; G06F 9/453; G06F 16/24578; G06F 16/632; G06F 21/6245; G06F 40/205; G06F 16/2455; G06F 16/3343; G06F 16/9535; G06N 20/00; G08B 21/043; G10L 13/00; G10L 15/063; G10L 15/1822; G10L 15/22; G10L 15/30; G10L 15/32; G10L 21/0232; G10L 25/51; G10L 2015/088; G10L 2015/223; G10L 15/08; G10L 15/20; G10L 21/0216; H04L 67/568; H04L 67/75; H04L 12/2809; H04L 51/216; H04M 3/42; H04N 7/142; H04N 21/4104; H04N 21/44227; H04N 21/4147; H04R 1/025; H04R 1/04; H04R 1/028; H04R 1/288; H04R 1/2888; H04R 1/403; H04R 1/406; H04W 4/90; G06Q 50/06
(Continued)

(56) References Cited

U.S. PATENT DOCUMENTS

10,916,248 B2 * 2/2021 Gomes .................... G10L 15/08
11,024,307 B2 * 6/2021 Choi ....................... G10L 15/22
(Continued)

*Primary Examiner* — Gerald Gauthier
(74) *Attorney, Agent, or Firm* — Haug Partners LLP (57) ABSTRACT

Embodiments of the present invention provide for systems and methods for submitting speech queries to one or more voice assistant devices, and retrieving the responses, in a soundproof environment. The systems and methods provide for sound-dampening voice boxes that are configured to house the respective voice assistant devices, in which the sound-dampening voice boxes submit speech queries to the respective voice assistant devices, and retrieve the responses therefrom.

14 Claims, 6 Drawing Sheets

User Interface 400

(51) Int. Cl.
*G06F 3/16* (2006.01)
*G10L 13/00* (2006.01)
*G10L 15/18* (2013.01)
*H04R 1/04* (2006.01)
*H04R 1/28* (2006.01)
*H04R 1/02* (2006.01)
*G10L 15/08* (2006.01)
*H04L 67/75* (2022.01)

(52) U.S. Cl.
CPC .......... *G10L 15/1822* (2013.01); *G10L 15/30* (2013.01); *H04R 1/025* (2013.01); *H04R 1/04* (2013.01); *H04R 1/2888* (2013.01); *G10L 2015/088* (2013.01); *G10L 2015/223* (2013.01); *H04L 67/75* (2022.05); *H04R 1/288* (2013.01)

(58) Field of Classification Search
USPC ........................................ 455/414.1; 704/235
See application file for complete search history.

(56) References Cited

U.S. PATENT DOCUMENTS

| | | | |
|---|---|---|---|
| 11,048,293 B2* | 6/2021 | Shin | G06F 3/167 |
| 11,152,003 B2* | 10/2021 | O'Donovan | G10L 15/32 |
| 11,218,429 B2* | 1/2022 | Yun | G06F 40/205 |
| 11,373,652 B2* | 6/2022 | Gruenstein | G10L 15/063 |
| 2016/0036751 A1* | 2/2016 | Ban | H04M 3/42 |
| | | | 455/414.1 |
| 2017/0017694 A1* | 1/2017 | Roytman | G06N 20/00 |
| 2017/0025124 A1* | 1/2017 | Mixter | G10L 15/32 |
| 2017/0242860 A1* | 8/2017 | Soughe | G06F 16/24578 |
| 2017/0332035 A1* | 11/2017 | Shah | H04N 21/4104 |
| 2018/0096690 A1* | 4/2018 | Mixter | G10L 15/22 |
| 2018/0096696 A1* | 4/2018 | Mixter | G10L 21/0232 |
| 2018/0293484 A1* | 10/2018 | Wang | G06F 16/632 |
| 2019/0074007 A1* | 3/2019 | Torpy | G10L 13/00 |
| 2019/0124049 A1* | 4/2019 | Bradley | G06F 9/453 |
| 2019/0171413 A1* | 6/2019 | Beatty | H04R 1/028 |
| 2019/0267005 A1* | 8/2019 | Owens | H04R 1/403 |
| 2019/0311710 A1* | 10/2019 | Eraslan | H04L 67/568 |
| 2019/0371312 A1* | 12/2019 | Naughton | G10L 15/22 |
| 2019/0371313 A1* | 12/2019 | Naughton | G10L 15/30 |
| 2019/0371339 A1* | 12/2019 | Humphrey | G10L 15/30 |
| 2020/0020328 A1* | 1/2020 | Gordon | G06F 21/6245 |
| 2020/0020329 A1* | 1/2020 | Gordon | G10L 25/51 |
| 2020/0105273 A1* | 4/2020 | O'Donovan | G10L 15/30 |
| 2020/0127988 A1* | 4/2020 | Bradley | G06F 3/165 |
| 2020/0236152 A1* | 7/2020 | Bradley | H04N 21/44227 |
| 2020/0251092 A1* | 8/2020 | Ivey | H04W 4/90 |
| 2020/0285443 A1* | 9/2020 | Yuan | H04N 7/142 |
| 2021/0038170 A1* | 2/2021 | Fountaine | G08B 21/043 |
| 2021/0082426 A1* | 3/2021 | Shuman | G06F 3/167 |
| 2021/0193132 A1* | 6/2021 | Hanes | G06F 16/3343 |
| 2022/0084507 A1* | 3/2022 | Cronin | G10L 15/22 |

* cited by examiner

401 Settings

Select Devices:
☐ Amazon Alexa ☐ Google Home
☐ Siri ☐ Other Devices ▽

Select Location:
Country ▽ City ▽

Select Voice:
Gender ▽ Language ▽

Other Settings:
Other ▽

402 Enter Questions 402b

Paste questions below or upload csv

| Question | Status |
|---|---|
| are burger king fries vegan | Done |
| best buy 7 systems best | Done |
| are tic tacs hugs compostable | Done |
| best beer | Done |
| are burger king burgers gluten free | Done |
| are foster farms nuggets free | Done |
| are foster farms crackers gluten free | Running |
| who is the president | Running |
| when does the basketball game start | Running |

402a

Submit Request: 402c

403 Voice Assistant Responses

[table of responses]

Download Data: 403a 403b 403c

User Interface 400
FIG. 4

402
Enter Questions

Paste Questions below or upload csv:  402b

| Question | Status |
|---|---|
| are burger king buns vegan | Done |
| best box 7 moons brand | Done |
| are tea bags compostable | Done |
| best beer | Done |
| are burger king burgers gluten free | Done |
| are foster farms nuggets fried | Done |
| are foster farms smokies gluten free | Done |
| who is the president | Running |
| where is Nike located | Running |
| when does the basketball game start | Running |

402a

Submit Request: Submit

SYSTEMS AND METHODS FOR VOICE SEARCH AND RESPONSE RETRIEVAL

CROSS-REFERENCE TO RELATED APPLICATION

This application claims the benefit of U.S. Provisional Patent Application No. 62/901,560, which was filed on Sep. 17, 2019 and is incorporated by reference in its entirety.

FIELD OF THE INVENTION

The present disclosure relates generally to systems and methods for submitting speech queries to one or more voice assistant devices, and retrieving the responses, in a sound-proof environment.

BACKGROUND OF THE INVENTION

Many companies value any insights into opportunities for potential customers to discover the company, its products, or its services. As companies develop their online presence, and become discoverable to consumers via network search engines, they often rely on analytics of consumer behavior online to identify ways to optimize their online presence, to reach the most consumers, or to reach the most relevant consumers. For example, search engine optimization (SEO) is a common method of broadening the reach of a website, using analytics to identify adjustments to the website that may help drive attractive consumers to discover that website.

With the rising prevalence of voice assistant devices (VADs), however, it is difficult to develop similar insights into potential consumers using VADs. VADs are network-connected devices that receive audio input, access the network to which it is connected, and provide an audio response based on the audio input. These devices interface with users through speech, instead of, or in addition to, a display. As the popularity of these devices increases, so does the use of VADs by consumers that many companies would like to reach.

However, VADs do not lend themselves to the same data gathering and analytical processes applied to network search engines interacting with users on traditional computing devices, such as desktop or laptop personal computers or mobile devices having touchscreen or keyboard interfaces. There are no sources for compiling data on VAD search and response, which cannot be searched directly by text input. Moreover, in certain circumstances, the results of a user's interaction with a VAD are more limited; instead of receiving several pages of search results in a viewable network browser, as in a typical network search, the results of a speech-based VAD search are often presented to the user as audio, limiting the breadth of results that can be provided to the user. This makes it both difficult to determine, at sufficient scale, the results of various searches, and more important for companies to reach the top of the search results to make it easier for VAD consumers to find them.

To gather this search result information from VADs requires presenting a question to a VAD and receiving the response. For the information to have any significance, it is important that the search result data is accessed at sufficient scale. In other words, the same (or similar) question has to be provided to a number of different VADs. However, assuming the VADs are in the same vicinity as each other, it is likely that one or more VADs will hear a query that was meant for another VAD. As such, to effectively access search result data from a variety of VADs, each VAD must be isolated from audio being presented to other VADs. Accordingly, there is a need for technological systems and methods for effectively isolating such VADs, as well as systems and methods for providing a large volume of queries to the VADs, and retrieve the responses therefrom.

SUMMARY OF THE INVENTION

Systems and methods are therefore described herein that overcome the limited user interface of VADs, to access the information provided by VADs at sufficient scale. According to an exemplary embodiment of the present disclosure, a voice box is provided that isolates a VAD from any unintended speech input, while programmatically generating speech queries to be presented to the VAD, waiting for the VAD's response, gathering that response, parsing the response, and storing the parsed information. The parsed responses may then be analyzed to provide insights useful to VAD interactions.

According to an embodiment, a system for isolating a VAD from unintended speech input can include: an enclosure including a plurality of sides, wherein the enclosure includes: at least one sound panel corresponding to at least one of the plurality of sides; a front panel, wherein: (i) the front panel includes a sound panel and a transparent panel, wherein an interior of the enclosure is visible through the transparent panel and (ii) the front panel is removable from the enclosure; a sound-dampening enclosure within the enclosure; a speaker, wherein the speaker is configured to play at least one speech query in the sound-dampening enclosure; a microphone, wherein the microphone is configured to receive audio output from the VAD in the sound-dampening enclosure; and a processor, wherein the processor is configured to control the operation of the speaker and the microphone.

According to an embodiment, a system for isolating a VAD from unintended speech input can include: (a) a plurality of enclosures configured to house respective VADs, wherein each enclosure includes: a speaker, wherein the speaker is configured to play at least one speech query in the enclosure; a microphone, wherein the microphone is configured to receive audio output from the respective VAD in the enclosure; and a processor, wherein the processor is configured to control the operation of the speaker and the microphone; and (b) a server, wherein the server is configured to provide a plurality of questions from a question queue to the plurality of enclosures; wherein the at least one speech query is based on at least one of the plurality of questions from the question queue; and wherein the audio output from the respective VAD corresponds to a response to the at least one of the plurality of questions from the question queue.

According to an embodiment, a method for isolating a voice assistant device VAD from unintended speech input can include: providing, with a server, a plurality of questions to a plurality of enclosures configured to house respective VADs; for each of the plurality of enclosures: (i) receiving at least one of the plurality of questions; (ii) synthesizing, with a processor, the at least one of the plurality of questions into at least one speech query; (iii) playing, with a speaker, the at least one speech query in the enclosure; (iv) recording, with a microphone, audio output from the respective VAD in the enclosure; (v) converting, with the processor, the audio output into a text format; and (vi) providing, with the processor, the text format and the at least one of the plurality of questions to the server.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
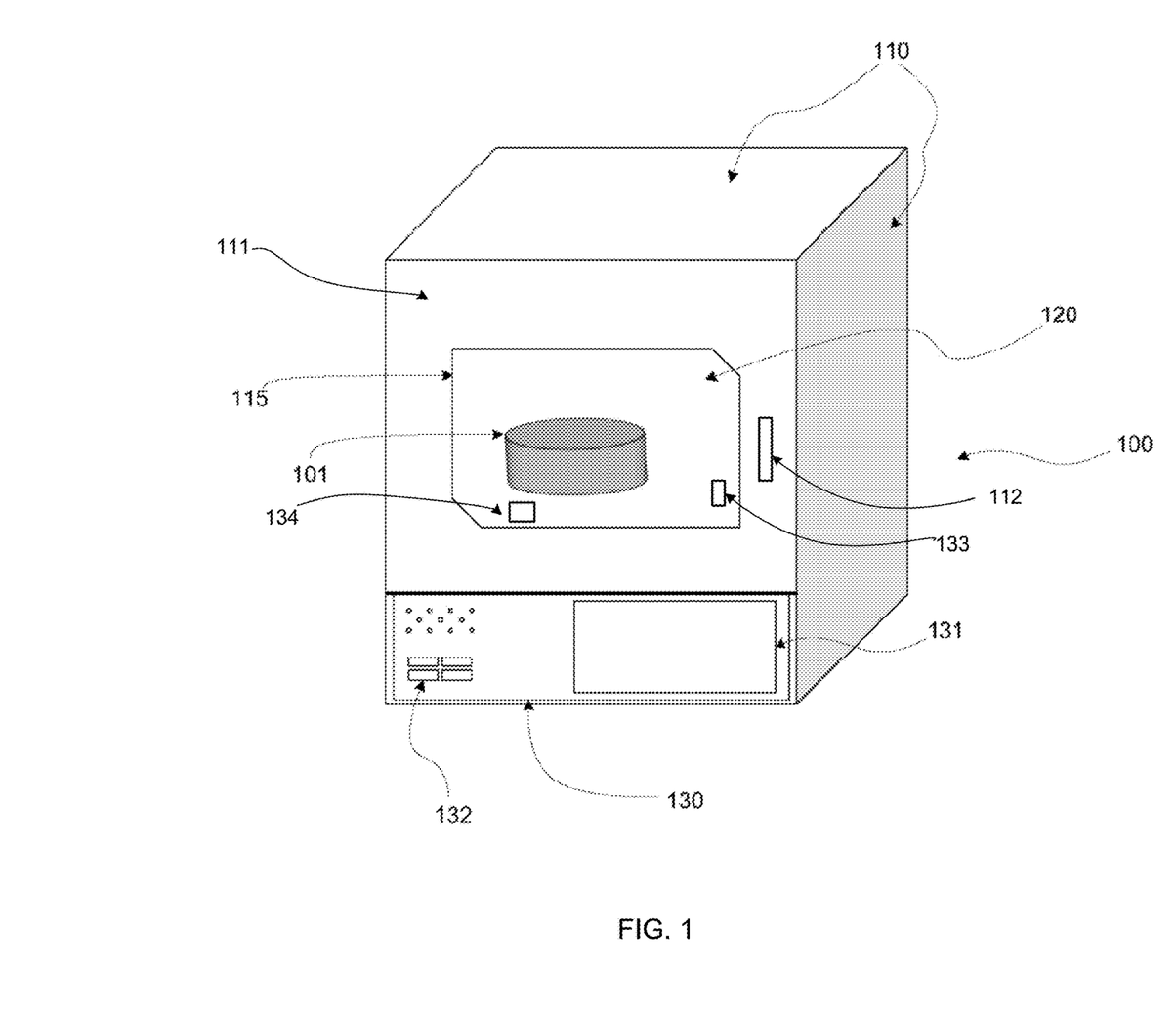
FIG. 1 is an illustration of a voice box in accordance with exemplary embodiments of the present disclosure.

FIG. 1 provides an illustration of a voice box according to an exemplary embodiment of the present disclosure. As depicted in the figure, a voice box 100 can be an enclosure including a plurality of sides. For example, the voice box 101 can be in the shape of a cube and/or rectangular prism. For a VAD 101 placed inside the voice box 100, the voice box 100 provides a sound-proof environment in which the VAD 101 can be isolated from unintended speech input. This reduces the errors associated with unintended speech input, and is particularly useful in a system including several VADs 101 receiving several speech inquiries. Each VAD 101 can be placed inside of its own voice box 100, so that the speech inquiry intended for one VAD 101 is not also received by another VAD 101. The voice box 100 can include a sound panel 110, a VAD sound enclosure 120, and a technology tray 130. Further, in exemplary embodiment, the exterior of the voice box 100 is configured to be placed within a standard server rack. In this regard, the exterior of the voice box 100 can be attached to a server tray with a drawer, which can then be mounted on to the server rack. As such, a plurality of voice boxes 100 can be mounted onto the same server rack.

The sound panel 110 is a sound-absorbing panel that makes up at least a portion of voice box 100. The sound panel 110 helps to prevent unintended speech, ambient noise, or other auditory pollution from interfering with the speech input to the VAD 101 positioned within the voice box 100. The sound panel 110 may include two medium density fiberboards sandwiching (e.g., on either side of) a layer of mass-loaded vinyl. In an exemplary embodiment, each of the fiberboards is ¾ of an inch thick. In an exemplary embodiment, the mass-loaded vinyl is 1 lb. mass-loaded vinyl.

The sound panel 110 may make up one or more of the sides of voice box 100. In an exemplary embodiment, the sound panel 110 makes up 5 sides of voice box 100, including the top, bottom, left, right, and back sides. In an exemplary embodiment, a front panel 111 of voice box 100 may partially include a sound panel 110, and may further partially include a transparent panel 115 such that the interior of the voice box is visible. As such, any feedback lights from VAD 101 are also made visible. For example, the VAD 101 can emit a particular light (e.g., red ring) if there's some sort of error. Further, the VAD 101 can also emit a particular light when it's processing a speech query. Further, the transparent panel 115 also helps to provide a sound-proof environment in which a VAD 101 can be isolated from unintended speech input. In an exemplary embodiment, the transparent panel 115 may include two layers of high-density acrylic with an air gap that is ¼ of an inch thick. In an exemplary embodiment, the transparent panel 115 may further include a 1 inch "tortured" sound path lip. A "tortured" sound path is a design element used to dampen sound in areas where there is joint between two materials. A "tortured" sound path forces sound waves to pass through a non-linear path, forcing the sound waves to negotiate a series of, e.g., sharp bends, which weakens the strength of the sound waves. Further, in an exemplary embodiment, the front panel 111 is removable from the voice box 100. In this regard, an inside surface of the front panel 111 can include magnetic strips along its perimeter which can magnetically attach to an outside surface of the voice box 100. Further, in an exemplary embodiment, the front panel 111 can include at least one handle 112 in order to open and close the voice box 100. As such, the VAD 101 can be inserted into and/or removed from the voice box 100 with relative ease.

Inside the voice box 100 is a VAD sound enclosure 120. When a VAD 101 is placed within the enclosure 120, it can be isolated from noise interference, such that only the intended speech inputs are received by the VAD 101. This is particularly useful when providing several speech inputs to many different VADs at the same time. Further, voice box 100 can also include interior lighting, e.g., a light-emitting diode (LED), for viewing and signaling which VAD units 101 are active. Further, the LED can be programmatically-controlled by a processor (e.g., processor 140) to activate when a run is being performed. Further, in an exemplary embodiment, the VAD sound enclosure 120 can include sound foam along the surfaces of the enclosure, thereby reducing any potential echo effects from the sound coming from the VAD 101.

The voice box 100 further includes technology tray 130, including a display 131, I/O port(s) 132, a speaker 133, a microphone 134, and a processor 140 (not pictured). The technology tray 130 may be retractable, such that the tray can be opened to allow for adjustments to the enclosed technological components (e.g., power transformers, power strips, cables, etc.), or removed entirely. The technological components may be placed within the tray such that adjustments may be made without completely disconnecting all of the technological components. Further, in an exemplary embodiment, the tray 130 can be used to isolate the heat sources associated with voice box 100 other than the VAD 101. In this regard, the tray 130 can include a plurality of perforations in order to provide ventilation to the enclosed technological components. Further, in an exemplary embodiment, cables from the tray 130 can be routed to the enclosure 120 via additional sound foam and another "tortured" sound path, thereby adding additional sound dampening for the enclosure 120.

The display 131 may be a liquid crystal display (LCD), e.g., thin-film-transistor (TFT) LCD, in-place switching (IPS) LCD, capacitive or resistive touchscreen LCD, etc. Further, the display 131 can also be an organic light emitting diode (OLED), e.g., active-matrix organic light emitting diode (AMOLED), super AMOLED, etc. The display 131 may serve as a management tool, allowing for the monitoring of the status/progress of queries being posed, and identifying any problems.

The speaker 133 is configured to play audio, in particular, for a speech query, inside the VAD sound enclosure 120, such that the VAD 101 can receive the speech query. The microphone 134 is configured to receive any audio output by the VAD 101 within the VAD sound enclosure 120.

The processor 140 may be programmed to control the operation of the voice box 100, including the speaker 133 and the microphone 134. The processor 140 may be network-connected, including sufficient components to communicate over a network, such as the Internet. This allows the processor 140, and therefore the voice box 100, to be controlled remotely. This allows the processor 140, and therefore the voice box 100, to receive instructions for queries to be presented to the VAD 101, and to transmit the received response from the VAD 101 to a remote server. The voice box 100 may further include a memory used to store computer instructions and data including all forms of non-volatile memory, including, by way of example, semiconductor memory devices, e.g., DRAM, SRAM, EPROM, EEPROM, and flash memory devices; magnetic disks, e.g., internal hard disks or removable disks; magneto-optical disks; and CD-ROM and DVD-ROM disks. Further, the processor 140 may be suitable for the execution of a computer program and may include, by way of example, both general and special purpose microprocessors, and any one or more processors of any kind of digital computer. For example, the processor 140 may receive instructions and data from the memory. Further, the memory and the processor 140 may be supplemented by, or incorporated in, special purpose logic circuitry. Further, in an exemplary embodiment, the memory may include one or more configuration files associated with the respective VAD 101. In this regard, each voice box 100 can be figured to a particular VAD 101 based on the specifications in the configuration file. For example, the configuration file can include: (i) the type of VAD 101, (ii) language (e.g., English, Spanish, German, etc.), language accent (e.g., U.S. English, U.K. English, Australian English, etc.), and gender (e.g., male/female) associated with the speech query, (iii) location (e.g., New York, London, Tokyo, etc.) of the voice box 100, (iv) cadence of the speech query, (v) response wait time length, and (vi) recording time length. Further, according to an embodiment, the configuration file can also include a device trigger phrase (e.g., to activate the VAD 101), a database storage location, custom vocabulary AI transcription model (e.g., trained transcription model for hard-to-transcribe words) to use for particular landscapes/industries (e.g., technical vocabulary, travel vocabulary, etc.), and custom question retries if there are no answers to the initial questions.

Voice box 100 may be connected to one or more communications networks. The communications networks can be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34b is analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network. The communications networks can also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Communications networks can further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Further, in an exemplary embodiment, voice box 100 can include an external audio jack 113 (not pictured) for monitoring the audio input/output.

Figure 2:
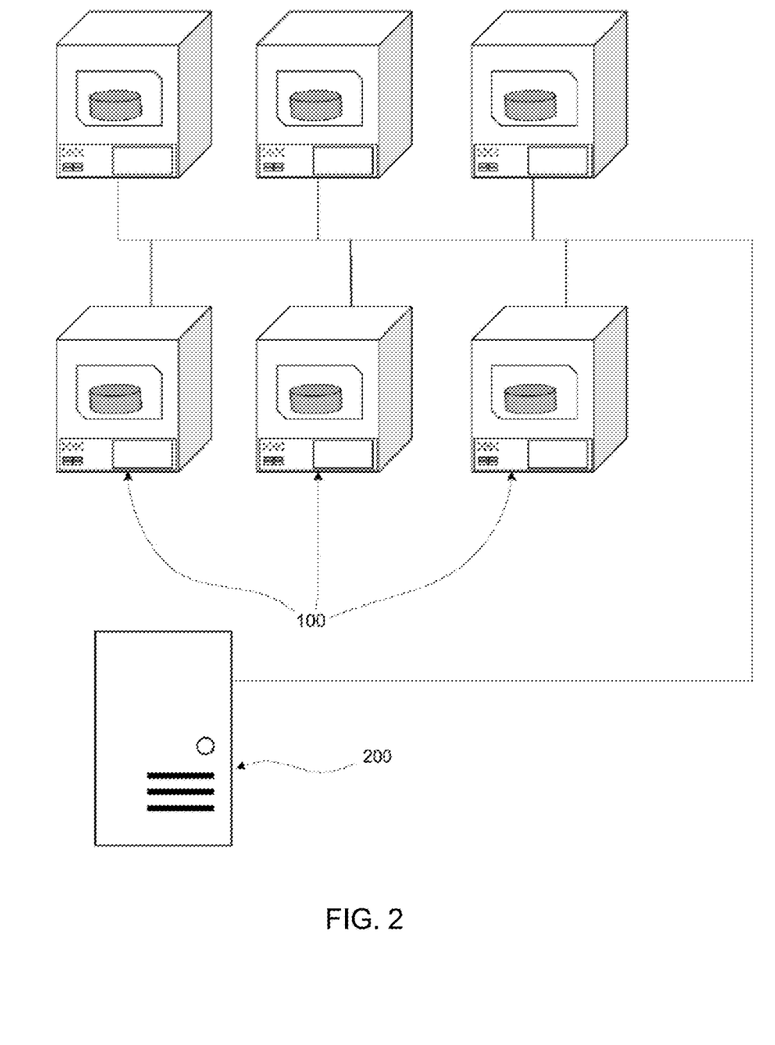
FIG. 2 is an illustration of a system of voice boxes in accordance with exemplary embodiments of the present disclosure.

As illustrated in FIG. 2, a plurality of voice boxes 100 may be assembled under the control of a remote computer or the server 200, such that a plurality of VADs can be examined simultaneously. Six voice boxes 100 are illustrated in the figure, but there is no limit on the number of voice boxes that may be included and remain within the scope of the present disclosure. In this arrangement, each of the plurality of voice boxes 100 includes a VAD 101. A computer or server 200 prepares a question queue, including all of the generated questions to be posed to the VADs. The server 200 distributes the questions from the question queue to the plurality of voice boxes 100, so that each voice box 100 may present the question to its respective VAD 101 as a speech inquiry, and record the response. The responses may then be transmitted back to the server 200 for analysis. This arrangement allows for a large number of VADs to be queried by speech input simultaneously, such that a sufficiently large, and broad, set of queries and responses thereto can be gathered for analysis.

Further, in an exemplary embodiment, a plurality of voice boxes 100 can be associated with a particular VAD 101. As such, questions for a particular VAD 101 can be provided to the plurality of voice boxes 100 associated with the particular VAD 101 based on the availability of the plurality of voices boxes 100. In an exemplary embodiment, the server 200 is able to determine which voice box 100 is associated with which VAD 101 based on the configuration file associated with each voice box 100. In this regard, after one of the plurality of voice boxes 100 gets through presenting a question and recording the response to it, the server 200 can provide the next question in the queue to that voice box 100. Similarly, after one or more voice boxes 100 conclude going through the questions associated with a first question queue, they can then move on to the next question queue, thereby providing for a more efficient and dynamic use of voice boxes 100. Further, in another exemplary embodiment, each question in the question queue can be associated with a corresponding priority level. As such, certain questions can be asked before other questions. According to an embodiment, the priority can be based on the urgency of the projects associated with the questions. As such, urgent and/or time-sensitive projects can get a higher priority level.

Figure 3:
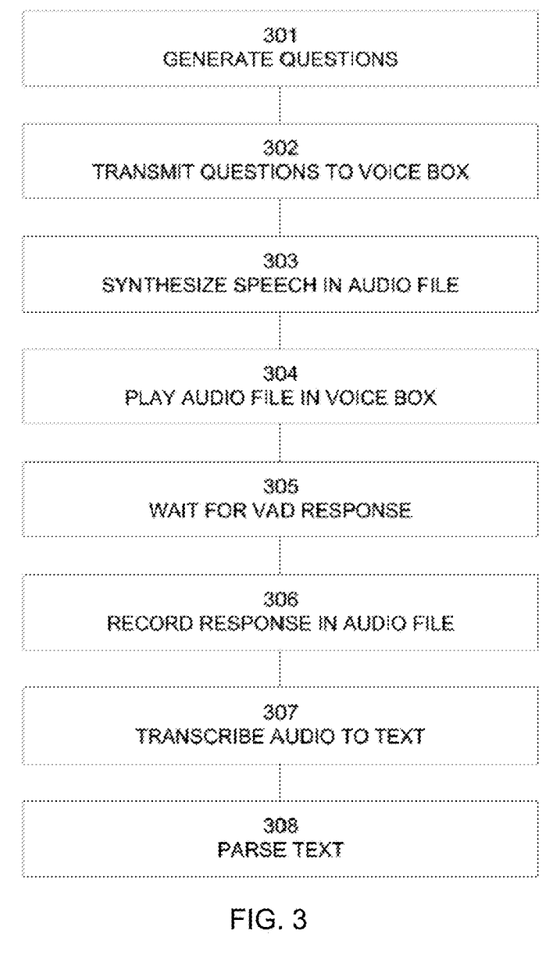
FIG. 3 is a flowchart illustrating a method for voice search and response retrieval in accordance with exemplary embodiments of the present disclosure.

FIG. 3 illustrates a flowchart of an exemplary method of the present disclosure. In step 301, questions are generated using an analytic toolset developed to more easily retrieve and organize question from external sources, for example, Google, Answer the Public, SEM Rush, Paid search SQR files, and Google Search Console. Application programming interfaces (APIs) may connect with these data sets, and apply algorithms to transform the data into useful formats, and to tag and organize these questions according to various metrics.

Figure 4:
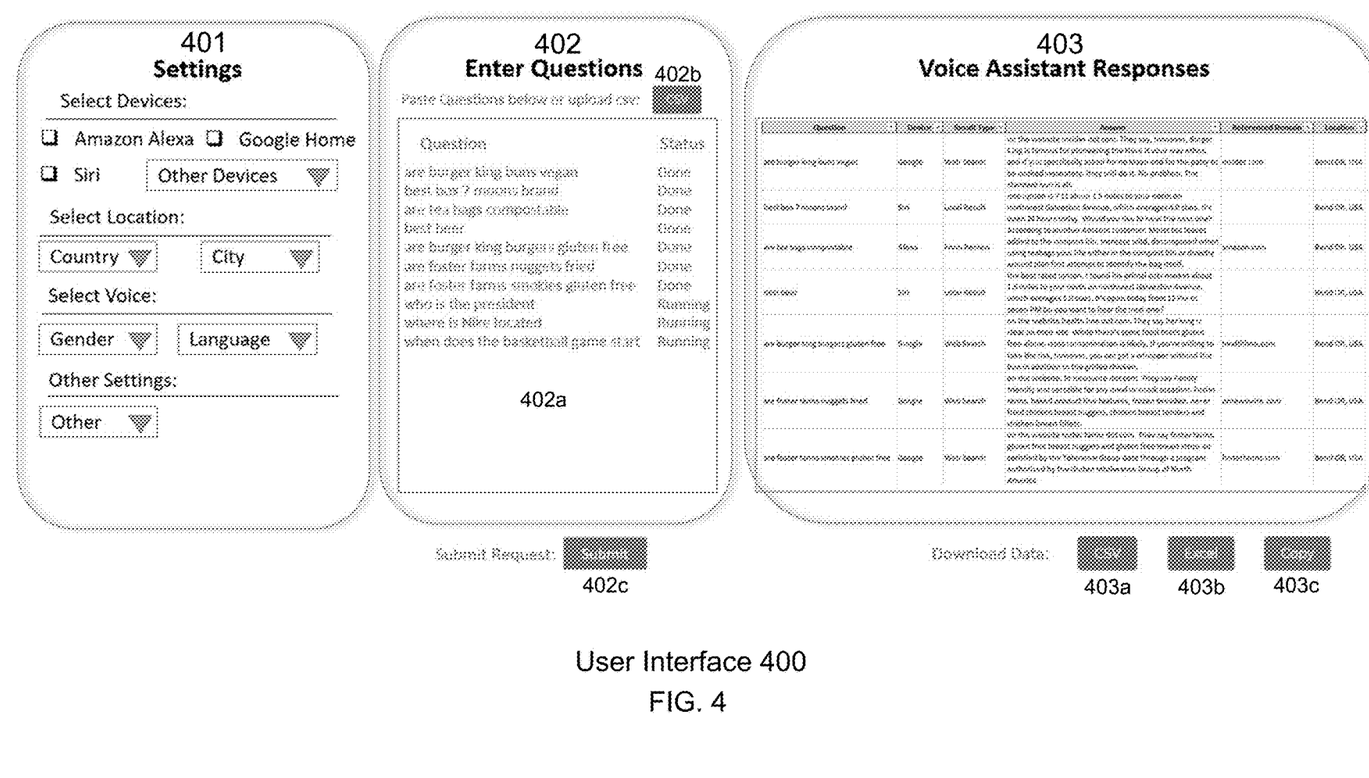
FIG. 4 is an illustration of a user interface for the voice box in accordance with exemplary embodiments of the present disclosure.

In an exemplary embodiment, the questions can be input from a front-end user interface, e.g., as depicted in FIG. 4. In this regard, a user can enter and or paste at least one question into the user interface. Further, the at least one question can be provided to the user interface via a tabular format file, e.g., a comma-separated values (CSV) file.

The text of each question is loaded to a question queue in preparation for transmission to the voice boxes 100. The text questions may be generated by processing components of the server 200, and the questions queue may be stored at the server 200. In step 302, the text questions from the question queue are distributed from the server 200 to the various voice boxes 100 subject to the speech query analysis of the present disclosure. In an exemplary embodiment, the various voice boxes 100 can correspond to different types of VADs 101. In this regard, the server 200 can determine the type of VAD 101 associated with the various voice boxes 100 based on the one or more configuration files in voice boxes 100. Further, based on the information in the configuration file, the server 200 can send particular questions from the question queue to voice boxes 100. In an exemplary embodiment, the configuration file information may be provided from the various voices boxes 100 to the server 200 in response to a request for said information from the server 200. In an exemplary embodiment, the voice boxes 100 can dynamically identify the type of VAD 101 being placed in the enclosure 120. In this regard, the voice box 100 can ask the VAD 101 a series of questions to determine what type of VAD it is (e.g., "Hey Alexa, what time is it?," "Hey Siri, what time is it?," "Hey Google, what time is it?", etc.). Based on the response from the VAD 101, the voice box 100 can select the configuration file associated with type of VAD 101. In another exemplary embodiment, the type of VAD can be predefined for the voice boxes 100.

In step 303, the text questions are subject to speech synthesis processing by the processor 130, resulting in an audio file of the question. The audio file may be any format of audio file, including a .wav file. Any known speech synthesis processing may be applied to the text questions, including Amazon Polly.

In step 304, the audio file can then be played back inside voice box 100, using speaker 133, as a speech query to the specific VAD 101 within the voice box 100. In this regard, the speech query can be played in a desired language, accent, and gender. As described above, this information can be found in the configuration file. In step 305, the voice box waits for a response from the VAD 101. In an exemplary embodiment, the response wait time is adjustable and can also be found in the configuration file. In this regard, if the VAD fails to respond to the speech query, an error report can be generated and provided to the server 200. As such, the speech query can be re-asked at a later time.

In step 306, when the VAD 101 responds to the speech query, the response is received by the microphone 134, and the response is recorded to an audio file, e.g., .wav file. In an exemplary embodiment, the response is recorded for a certain period of time. As such, if the duration of the response is longer than the certain period, the response will likely be cut off at its tail end. In another exemplary embodiment, the response can be recorded for its entire duration. In this regard, the end of the response duration can be detected based on the sound waves coming from VAD 101. For example, if the sound waves from VAD 101 fall below a predefined sound wave level, then it is likely that the response has concluded.

In step 307, the audio file is submitted to speech transcription processing, resulting in a text version of the VAD response. Any known speech transcription processing may be applied to the audio file, including Amazon Transcribe.

The speech synthesis and speech transcription processes may be carried out on the server 200, or may be carried out at each voice box 100. On one hand, processing recourses at the voice box 100 may be preserved by executing these processes at server 200. On the other hand, transmission resources may be preserved by transmitting only the text of the questions and responses, instead of the audio files.

After the audio file of the response is converted into a text version, it can be provided with the corresponding text version of the question to a database at the server 200. The above process is repeated for every other question in the question queue. Once all the questions in the queue have been attempted, the database is checked to verify that responses were retrieved for all questions. In this regard, if there are any missing responses, the questions are re-queued by the server 200 and ran again. In an exemplary embodiment, the re-queued questions can be run at the voice box 100 at a modified cadence. In another exemplary embodiment, the re-queued question can also include at least one of a modified language, a modified accent, and a modified gender.

After all the responses are retrieved (or re-try attempts exhausted), a complete question and answer (Q & A) text file is generated and submitted for post-processing and analysis.

In step 308, the server 200 parses the text of the Q & A file to allow for the categorization or tagging of the responses. For example, if one or more brands are the focus of the analysis, mentions of the brand(s) in the VAD 101 responses may be tagged or otherwise designated. As another example, citations supporting the VAD 101 response, or any other indication of the source of the VAD 101 response, may be stored. In this regard, URLs referenced by the VADs 101 can be identified and tagged. As another example, other metrics associated with the VAD 101 response may be noted, such as the length of the VAD 101 response. Further, the server 200 can also identify VAD 101 response intent based on certain keywords and response patterns According to an embodiment, intent can be derived from keyword usage in the response. For instance, if the VAD 101 tries to add a product, which it just described to a user, to an online shopping cart or asks the user to purchase the product, it can be derived that the VAD response has a purchase intent. Further, answers sourced front online encyclopedias can have an informational intent, and answers describing how far away a user is from a location can have a navigational intent As such, based on the above categorization and tagging, visualizations can be generated that allow a user to filter, aggregate, and compare response types by device to bubble up insights.

Further, in an exemplary embodiment, the text, of the Q & A file can be run against a dictionary and/or grammar checker in order to record any grammatical and/or spelling errors in the questions and responses. In this regard, based on the number of errors and/or error rate, it can be determined if the question should be run again as well as if the cadence of the speech query should be modified. As such, if the number of errors and/or error rate exceeds a predefined threshold, the question can be re-run at a slower cadence. In another exemplary embodiment, artificial intelligence, e.g., a machine learning model, can be used to record the grammatical and/or spelling errors in the questions and responses.

In another exemplary embodiment, instead of parsing the text of the complete Q & A file, the parsing can be performed after each question in the question queue is answered.

Figure 5A:
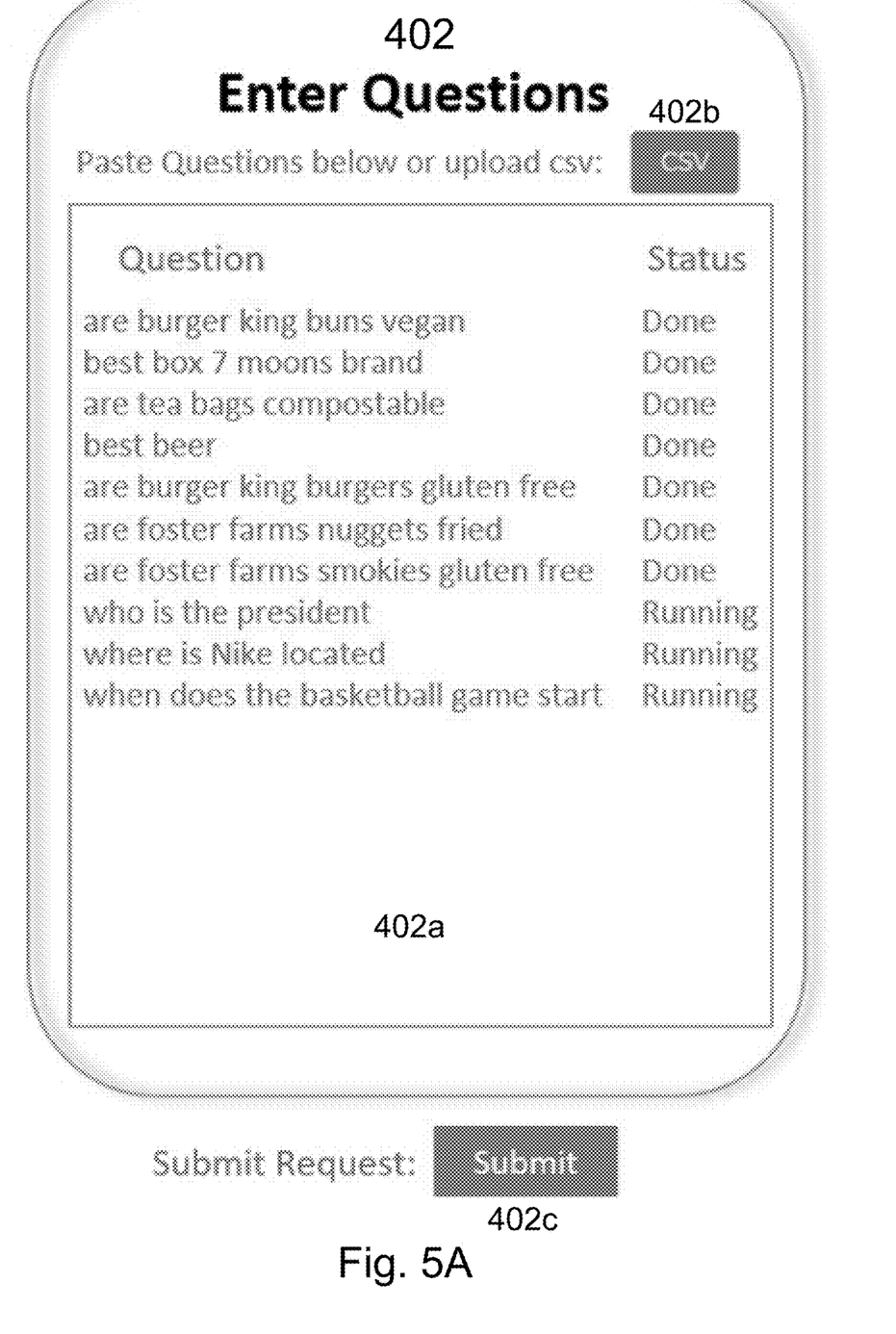
FIG. 5A is an illustration of a section in the user interface of FIG. 4.
Figure 5B:
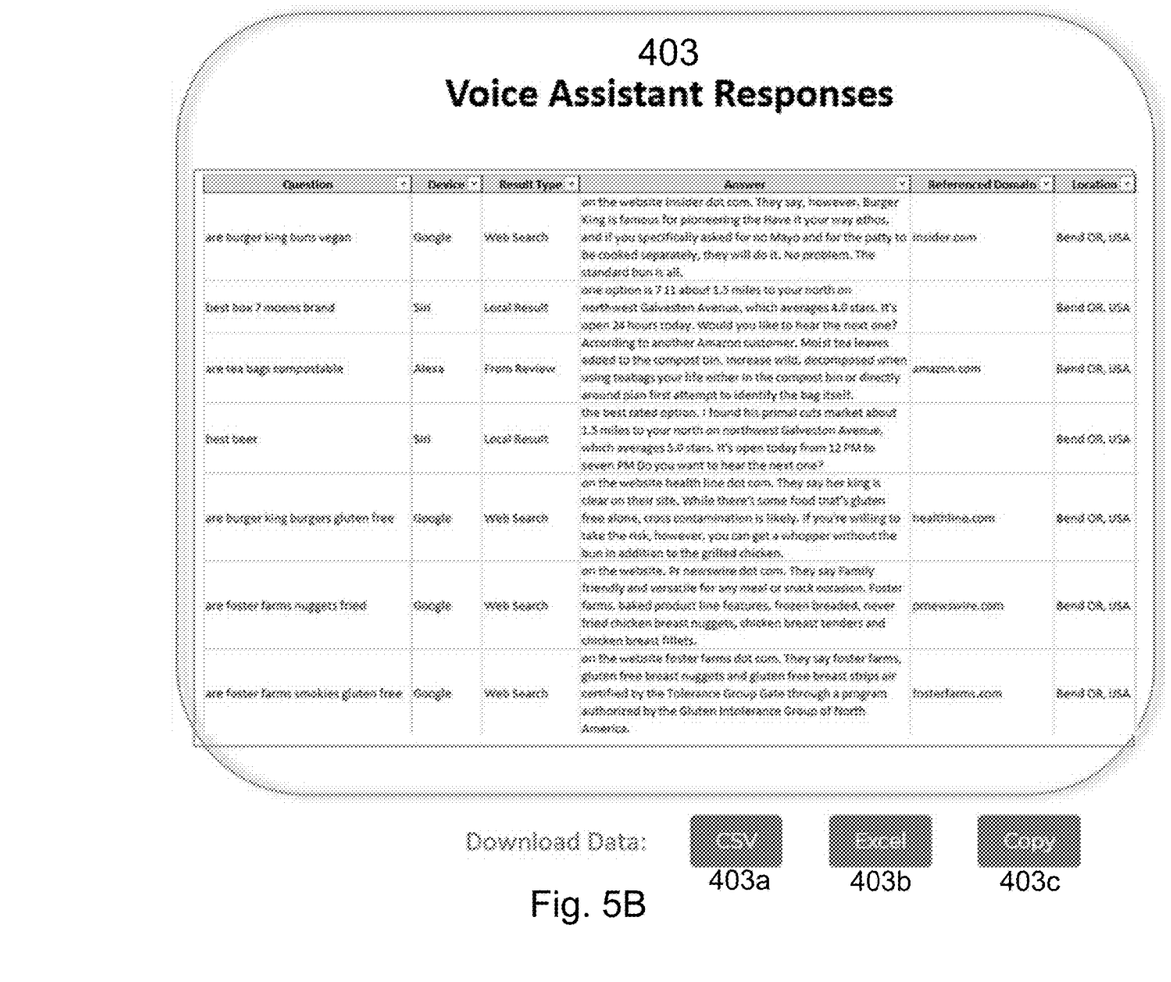
FIG. 5B is an illustration of another section in the user interface of FIG. 4.

FIG. 4 is an illustration of a user interface for the voice box in accordance with exemplary embodiments of the present disclosure. As depicted in the figure, a user interface 400 can include at least one of a settings section 401, a section 402 for entering questions, and a section 403 for displaying the VAD 101 responses. According to an embodiment, with the section 401, a user can configure the settings of a particular voice box 100. For example, the user can select the type of VAD 101 (e.g., Amazon Alexa, Google Home, Siri, other devices), the location of the voice box 100 (e.g., country, city, etc.), the voice of the voice box 100 (e.g., gender, language, etc.), as well as other settings. According to an embodiment, the configuration file associated with a particular voice box 100 can be updated based on the selected settings in section 401. Further, according to an embodiment, with the section 402 (which is also depicted in FIG. 5A), a user can submit desired questions by pasting the questions into a text field 402a or by uploading a CSV file including the questions to the user interface 400 (e.g., by selecting CSV button 402b). Once the questions are provided, they can be submitted for processing, e.g., by selecting the submit button 402c. Further, as depicted in the figure, the user interface 400 can also display that status of a particular question along side that question in the text field 402a. As such, if a response was provided for the question, the user interface 400 can indicate a status of "Done." On the other hand, if a response was not provided for a question, the user interface 400 can indicate a status of "Running." Further, according to an embodiment, with the section 403, a user can review the responses to the questions provided in the section 402. In particular, for each particular question, in addition to the text of the response, the section 403 (which is also depicted in FIG. 5B) can also provide (i) type of VAD 101 providing the response, (ii) the type of search performed for the response (e.g., web search, local search, etc.), (iii) any domain names referenced in the response, and (iv) the location of the voice box 100. Further, as depicted in the figure, the user interface 400 gives the user an ability to download the data in the section 403 in a number of formats (e.g., CSV, Excel) and/or copying the text of the data. In this regard, the data can be converted to a CSV file format by selecting the CSV button 403a, the data can be converted to an Excel file format by selecting the Excel button 403b, and the text of the data can be copied by selecting the copy button 403c. Further, according to an embodiment, the sections 401, 402, and 403 can be depicted in one or more windows of the user interface 400.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification and drawings, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A system for isolating a voice assistant device (VAD) from unintended speech input, the system comprising:
   an enclosure including a plurality of sides, wherein the enclosure includes:
      at least one sound panel corresponding to at least one of the plurality of sides;
      a front panel, wherein: (i) the front panel includes a sound panel and a transparent panel, wherein an interior of the enclosure is visible through the transparent panel and (ii) the front panel is removable from the enclosure;
      a sound-dampening enclosure within the enclosure;
      a speaker, wherein the speaker is configured to play at least one speech query in the sound-dampening enclosure;
      a microphone, wherein the microphone is configured to receive audio output from the VAD in the sound-dampening enclosure; and
      a processor, wherein the processor is configured to control the operation of the speaker and the microphone.

2. The system of claim 1, further comprising:
   a tray, wherein the tray is retractable and is configured to include the speaker, the microphone, the processor, and a display.

3. The system of claim 2, wherein the display is configured to display a status of the at least one speech query being played in the sound-dampening enclosure.

4. The system of claim 1, wherein the tray includes a plurality of perforations.

5. The system of claim 1, wherein an inside surface of the front panel includes magnetic strips along its perimeter, wherein the magnetic strips are magnetically attachable to an outside surface of the enclosure.

6. The system of claim 1, wherein the front panel includes at least one handle.

7. The system of claim 1, wherein the at least one sound panel includes two medium density fiberboards on either side of a layer of mass-loaded vinyl.

8. The system of claim 1, wherein the transparent panel includes two layers of high-density acrylic with an air gap.

9. A system for isolating a voice assistant device (VAD) from unintended speech input, the system comprising:
a plurality of enclosures configured to house respective VADs, wherein each enclosure includes:
a speaker, wherein the speaker is configured to play at least one speech query in the enclosure;
a microphone, wherein the microphone is configured to receive audio output from the respective VAD in the enclosure; and
a processor, wherein the processor is configured to control the operation of the speaker and the microphone; and
a server, wherein the server is configured to provide a plurality of questions from a question queue to the plurality of enclosures;
wherein the at least one speech query is based on at least one of the plurality of questions from the question queue; and
wherein the audio output from the respective VAD corresponds to a response to the at least one of the plurality of questions from the question queue.

10. The system of claim 9, wherein the processor is configured to: (i) synthesize the at least one of the plurality of questions into the at least one speech query, (ii) convert the audio output into a text format, and (iii) provide the text format and the at least one of the plurality of questions to the server.

11. The system of claim 9, wherein the plurality of questions is provided to the respective VADs as speech queries simultaneously.

12. The system of claim 9, wherein the at least one of the plurality of questions is associated with a corresponding priority level.

13. The system of claim 9, further comprising:
a user interface, wherein the user interface is configured to receive the plurality of questions for the question queue from a user.

14. The system of claim 13, wherein the plurality of questions can be provided with a tabular format file.

* * * * *